(12) United States Patent
Uckert et al.

(10) Patent No.: US 7,074,886 B2
(45) Date of Patent: Jul. 11, 2006

(54) ELECTROACTIVE FLUORENE POLYMERS HAVING PERFLUOROALKYL GROUPS, PROCESS FOR PREPARING SUCH POLYMERS AND DEVICES MADE WITH SUCH POLYMERS

(75) Inventors: Frank P. Uckert, Wilmington, DE (US); Andrew Edward Feiring, Wilmington, DE (US)

(73) Assignee: E. I. du Pont de Memours and Company, Wilmington, DE (US)

( * ) Notice: Subject to any disclaimer, the term of this patent is extended or adjusted under 35 U.S.C. 154(b) by 324 days.

(21) Appl. No.: 10/139,002

(22) Filed: May 3, 2002

(65) Prior Publication Data
US 2002/0177679 A1 Nov. 28, 2002

Related U.S. Application Data
(60) Provisional application No. 60/289,333, filed on May 7, 2001.

(51) Int. Cl.
*C08G 73/24* (2006.01)

(52) U.S. Cl. ...................... 528/401; 528/405; 528/408; 528/397

(58) Field of Classification Search ................ 528/397, 528/401, 408, 405; 526/326.2
See application file for complete search history.

(56) References Cited

U.S. PATENT DOCUMENTS

| | | | |
|---|---|---|---|
| 5,708,130 A | 1/1998 | Woo et al. | |
| 5,900,327 A | 5/1999 | Pei et al. | |
| 5,962,631 A | 10/1999 | Woo et al. | |
| 6,169,163 B1 | 1/2001 | Woo et al. | |

FOREIGN PATENT DOCUMENTS

| | | |
|---|---|---|
| WO | WO 99/54943 A1 | 10/1999 |
| WO | WO 00/55927 A1 | 9/2000 |

OTHER PUBLICATIONS

Cowell, Allan B. et al., Fluoroalkylation of Aromatic Compounds, Journal of Fluorine Chemistry, 17, 1981, 345–356, Elsevier Sequoia S.A., Lausanne, The Netherlands.

Kamigata, Nobumasa et al., Direct Perfluoroalkylation of Aromatic and Heteroaromatic Compounds with Perfluoroalkanesulfonyl Chlorides Catalysed by a Ruthenium (II) Phosphine Complex, J. Chem. Soc.Perkin Trans., 1, 1994, 1339–1346.

*Primary Examiner*—Ling-Siu Choi

(57) ABSTRACT

The present invention is generally directed to perfluoroalkylated fluorene polymers. It further relates to a process for preparing the polymers and devices that are made with the polymers.

8 Claims, 11 Drawing Sheets

(I)

I(a)

II(a)
 II(b)
 II(c)
 II(d)
 II(e)
 II(f)
 II(g)
 II(h)
 II(i)
 II(j)

II(t)    II(u)

II(v)     II(w)

II(x)     II(y)

II(z)

(III)

IV

IV(a)
 IV(b)
 IV(c)
 IV(d)
 IV(e)
 IV(f)
 IV(g)
 IV(h)

(V)

V(a)

V(b)

V(c)    V(d)

V(e)

(VIII)

(IX)

(X)

(XI)

(XII)

ELECTROACTIVE FLUORENE POLYMERS HAVING PERFLUOROALKYL GROUPS, PROCESS FOR PREPARING SUCH POLYMERS AND DEVICES MADE WITH SUCH POLYMERS

BACKGROUND OF THE INVENTION

This application claims priority to Provisional Application No. 60/289,333 filed May 7, 2001.

1. Field of the Invention

This invention relates to electroactive fluorene polymers having perfluoroalkyl groups, and to methods for producing such polymers. The invention further relates to electronic devices in which includes such polymeric materials.

2. Description of the Related Art

Organic electronic devices are present in many different kinds of electronic equipment. In all such devices, an organic active layer is sandwiched between two electrical contact layers. Examples of organic electronic devices include devices that emit light, such as light-emitting diodes (LEDs) that make up displays. In LEDs, at least one of the electrical contact layers is light-transmitting so that light can pass through the electrical contact layer. The organic active layer emits light through the light-transmitting electrical contact layer upon application of electricity across the electrical contact layers.

It is well known to use organic electroluminescent compounds as the active component in light-emitting diodes. Simple organic molecules such as anthracene, thiadiazole derivatives, and coumarin derivatives are known to show electroluminescence. Several classes of luminescent polymers have also been disclosed. These include, for example, poly(1,4-phenylene vinylene) and derivatives; polythiophenes, especially, poly(3-alkylthiophenes); and poly(p-phenylenes). Alkyl and dialkyl derivatives of polyfluorene have also been disclosed, as in U.S. Pat. Nos. 5,708,130 and 5,900,327.

There is a continuing need for photoactive compounds having improved efficiency and processes for preparing them.

SUMMARY OF THE INVENTION

The present invention is directed to polymers of fluorene and fluorene derivatives, wherein the polymers have perfluoroalkyl substituents on aromatic rings.

In one embodiment, the fluorene polymer comprises one or more monomeric units having a Formula I shown in FIG. 1, where:

R is a substituent on a carbon atom in an aromatic ring, which can be the same or different at each occurrence and is selected from hydrogen, alkyl, aryl, heteroalkyl, heteroaryl, F, —CN, —OR$^1$, —CO$_2$R$^1$, —C$_\psi$H$_\theta$F$_\lambda$, —OC$_\psi$H$_\theta$F$_\lambda$, —SR$^1$, —N(R$^1$)$_2$, —P(R$^1$)$_2$, —SOR$^1$, —SO$_2$R$^1$, —NO$_2$, and beta-dicarbonyls having Formula XII shown in FIG. 12 and as further described below under "Formula XII"; or adjacent R groups together can form a 5- or 6-membered ring selected from cycloalkyl, aryl, and heteroaryl rings, such that:

R$^1$ is a substituent on a heteroatom which can be the same or different at each occurrence and is selected from alkyl, aryl, heteroalkyl and heteroaryl; and $\psi$ is an integer between 1 and 20, and $\theta$ and $\lambda$ are integers satisfying Equation A1 below:

$$\theta + \lambda = 2\psi + 1; \quad \text{(Equation A1)};$$

R$^2$ is a substituent on a carbon atom not in an aromatic ring, which can be the same or different at each occurrence and is selected from hydrogen, alkyl, aryl, heteroalkyl, heteroaryl and —C$_\psi$H$_\theta$F$_\lambda$, with the proviso that the fluorene polymer contains at least one R substituent with the formula —C$_\psi$F$_{2\psi+1}$, where $\psi$ is as defined above.

In another embodiment, the fluorene polymer comprises at least one first monomeric unit having Formula I shown in FIG. 1, and at least one second monomeric unit, wherein the at least one second monomeric unit is selected from (i) aromatic groups having Formula II shown in FIG. 2, (ii) 6-membered heteroaromatic groups having Formula III, shown in FIG. 6; (iii) 5-membered heteroaromatic groups having Formula IV, shown in FIG. 7; (iv) aromatic groups having Formula V, shown in FIG. 8, (v) divalent fused ring aromatic groups having Formula VI through Formula VIII, shown in FIG. 9, and Formula IX through Formula XI, shown in FIG. 10, and (vi) combinations thereof, where:

in each of Formulae II, III, IV, V, VI, VII, VIII, and IX: R, R$^1$, R$^2$, $\psi$, $\theta$ and $\lambda$ are as defined above in Formula I;

E can be the same or different at each occurrence and is a single bond or a linking group selected from arylene and heteroarylene;

in Formula IV:

A is independently at each occurrence C or N and $\gamma$ is 0 or an integer selected from 1 or 2, such that when both A are N, then $\gamma$ is 0; or when one of A is N and one of A is C, then $\gamma$ is 1; or when both A are C, then $\gamma$ is 2;

Q is O, S, SO$_2$, or NR$^1$ where:

R$^1$ is a substituent on a heteroatom which can be the same or different at each occurrence and is selected from alkyl, aryl, heteroalkyl and heteroaryl;

in Formula V:

Q$^1$ is a carbonyl group, O, S, SO$_2$, or NR$^1$ where:

R$^1$ is a substituent on a heteroatom which can be the same or different at each occurrence and is selected from alkyl, aryl, heteroalkyl and heteroaryl;

W is H, alkyl or heteroalkyl; or both of W together can represent one single bond;

in Formula VI:

the two E's are in the 1,4-, 1,5-, 1,8-, 2,3-, or 2,6- positions;

in Formula VII:

the two E's are in the 1,4-, 1,5-, 1,8-, 2,3-, 2,6-, or 9,10-positions;

in Formula VIII:

a first E is in the 1, 2, or 3 position, a second E is in the 6, 7, or 8 position;

in Formula IX:

a first E is in the 2, 3, or 4 position; a second E is in the 7, 8, or 9 position; and in Formula XII:

R$^3$ is selected from hydrogen, alkyl, aryl, heteroalkyl and heteroaryl;

$\delta$ is 0 or an integer from 1 to 12;

with the proviso that the fluorene polymer contains at least one R substituent with the formula —C$_\psi$F$_{2\psi+1}$, where $\psi$ is as defined above.

The invention is further directed to a process for preparing fluorene polymers having perfluoroalkyl groups comprising:

forming a polymer having at least one monomeric unit having a Formula I shown in FIG. 1;

treating the polymer with a perfluoroalkylating reagent selected from (i) a perfluoroalkyl iodide and (ii) a perfluoroalkylsulfonyl chloride in the presence of a ruthenium(II) catalyst.

The invention is further directed to an organic electronic device having at least one emitting layer comprising the above perfluoroalkylated fluorene polymer.

As used herein, the term "alkyl" is intended to mean a group derived from an aliphatic hydrocarbon, and includes, linear, branched and cyclic groups, which may be unsubstituted or substituted. The term "heteroalkyl" is intended to mean a group derived from an aliphatic hydrocarbon having at least one heteroatom in the main chain, which group may be unsubstituted or substituted. The term "aryl" is intended to mean a group derived from an aromatic hydrocarbon, which may be unsubstituted or substituted. The term "heteroaryl" is intended to mean a group derived from an aromatic group containing at least one heteroatom, which group may be unsubstituted or substituted. The term "arylene" is intended to mean a group derived from an aromatic hydrocarbon having two points of attachment, which group may be unsubstituted or substituted. The term "heteroarylene" is intended to mean a group derived from an aromatic group having at least one heteroatom and having two points of attachment, which group may be unsubstituted or substituted. The phrase "adjacent to," when used to refer to layers in a device, does not necessarily mean that one layer is immediately next to another layer. On the other hand, the phrase "adjacent R groups," is used to refer to R groups that are next to each other in a chemical formula (i.e., R groups that are on atoms joined by a bond). The terms "fluorene polymer" and "perfluoroalkylated fluorene polymer" are intended to mean both homopolymers and copolymers. The term "base fluorene polymer" intended to mean fluorene polymers without any perfluoroalkyl groups. The term "photoactive" refers to any material that exhibits electroluminescence and/or photosensitivity. The term "electroactive" refers to any material that exhibits hole transport/injection property, electron transport/injection property, electroluminescence, and/or photosensitivity. The term "monomeric unit" refers to a repeating unit in a polymer. In addition, the IUPAC numbering system is used throughout, where the groups from the Periodic Table are numbered from left to right as 1–18 (CRC Handbook of Chemistry and Physics, 81$^{st}$ Edition, 2000).

DETAILED DESCRIPTION OF THE PREFERRED EMBODIMENTS

The fluorene polymers of the invention contain at least one fluorene-based monomeric unit (Formula I) and may contain other aromatic monomeric units (Formulae II, III, IV, V, VI, VII, VIII, IX, X, and XI), wherein at least one of the aromatic rings in the polymer is substituted with at least one perfluoroalkyl group.

First Monomeric Unit

Figure 1:
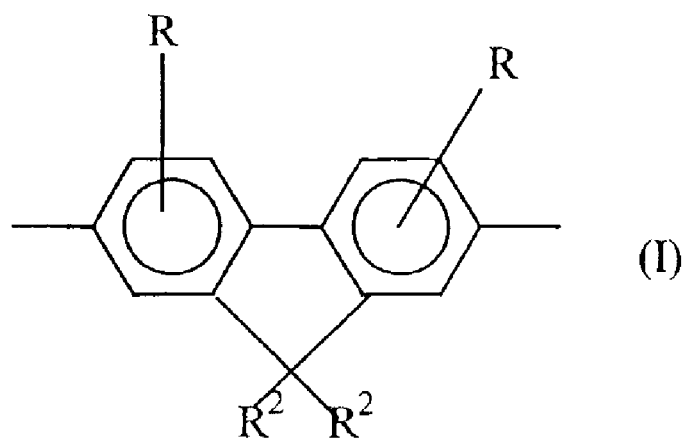
FIG. 1 shows Formula I and Formula I(a) for the first monomeric unit useful in the invention.
Figure 1:
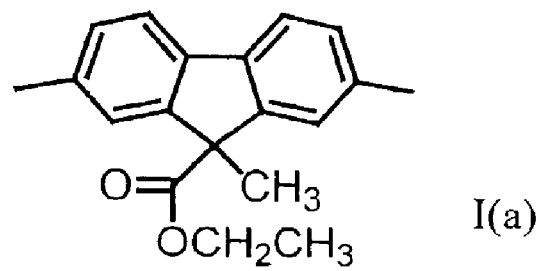

The base fluorene polymers have at least a first monomeric unit having a Formula I shown in FIG. 1. The fluorene polymers can be copolymers of two or more different monomeric units having Formula I. The preferred R groups are alkyl groups having 1 to 30 carbon atoms, heteroalkyl groups having 1–30 carbon atoms and one or more heteroatoms of S, N, or O, aryl groups having from 6 to 20 carbon atoms (alternatively, from 6 to 18 carbon atoms), and heteroaryl groups having from 2 to 20 carbon atoms (alternatively, from 2 to 18 carbon atoms) and one or more heteroatoms of S, N, or O. Examples of suitable R groups include n- and iso-butyl, pentyls, both linear and branched, hexyls, octyls, including 2-ethyl hexyl, up through hexadecyls and above, with and without olefinic unsaturation; phenyl, thiophene, carbazole, alkoxy, phenoxy and cyano groups. More preferred R groups on the phenyl rings of the fluorene monomeric unit are H, $C_1$–$C_{12}$alkoxy (alternatively, $C_1$ through $C_4$ alkoxy or $C_6$ through $C_{12}$ alkoxy), phenoxy, $C_1$–$C_{12}$alkyl (alternatively, $C_1$ through $C_4$alkyl or $C_6$ through $C_{12}$ alkyl), phenyl or cyano.

Preferred $R^2$ groups are alkyl groups having from 1 to 30 carbon atoms and heteroalkyl groups having from 1–30 carbon atoms and one or more heteroatoms of S, N, or O. More preferred $R^2$ groups are selected from linear $C_6$ through $C_{12}$ alkyls (alternatively, linear $C_6$ through $C_{10}$ alkyls) and branched $C_6$ through $C_{12}$ alkyls (alternatively, branched $C_6$ through $C_{10}$ alkyls).

An example of a suitable first monomeric unit is shown in FIG. 1 as Formula I(a).

Second Monomeric Unit

Figure 12:
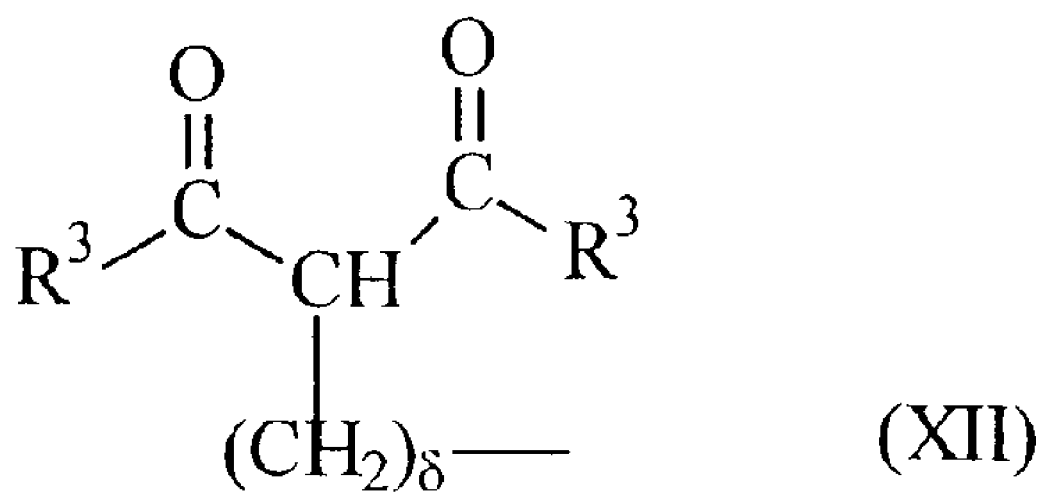
FIG. 12 shows Formula XII for a substituent for a second monomeric unit useful in the invention.

In each of Formulae II, III, IV, V, VI, VII, VIII, and IX, where any one or more of E linking groups are selected from heteroarylenes, then the hetereoarylenes can be selected from groups having Formulae XIII and XIV shown in FIG. 12, where:

in Formula XIII:
 R is as described above for each of I, II, III, IV, V, VI, VII, VIII through XI;
 $E^1$ is a single bond;
in Formula XIV:
 R and Q are as described above for each of I, II, III, IV, V, VI, VII, VIII through XI; and
 $E^1$ is a single bond.

Figure 2:
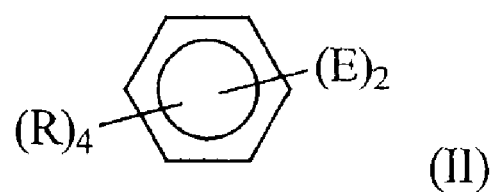
FIG. 2 shows Formula II for the second monomeric unit useful in the invention.

Formula II:

The second monomeric unit can be an aromatic group having the structure shown in FIG. 2, Formula II. The R groups are preferably selected from:
 hydrogen;
 alkyl;
 aryl;
 heteroalkyl;

heteroaryl;
F;
—CN;
—NO$_2$;
a beta-dicarbonyl having Formula XII shown in FIG. 12 and as further described above;
—C$_\psi$H$_\theta$F$_\lambda$;
—OC$_\psi$H$_\theta$F$_\lambda$; and
—P(R$^1$)$_2$, —SOR$^1$, —OR$^1$, —CO$_2$R$^1$, —SR$^1$, —N(R$^1$)$_2$, and —SO$_2$R$^1$, where R$^1$ is a straight chain or branched alkyl of from 1 to 20 carbons or a straight chain or branched heteroalkyl; or adjacent R groups together can form a 5- or 6-membered ring selected from cycloalkyl rings, aryl rings and heteroaryl rings.

Alternatively, the R groups in Formula II are selected from:
  alkyl groups having from 1 to 12 carbon atoms;
  partially or fully fluorinated alkyl groups having from 1 to 12 carbon atoms, especially CF$_3$;
  aryl groups having from 6 to 20 carbon atoms;
  heteroaryl groups having from 4 to 20 carbon atoms and substituted with O, S, or N;
  alkoxy groups having from 1 to 12 carbon atoms; and
  esters having from 3 to 15 carbon atoms.

Figure 3:
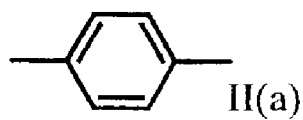
FIG. 3 shows Formulae II(a) through II(j) for a second monomeric unit useful in the invention.
Figure 3:
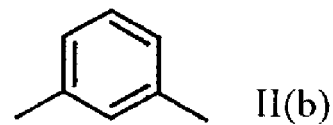
Figure 3:
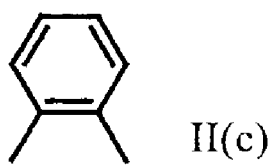
Figure 3:
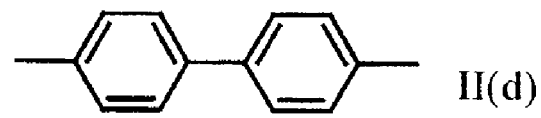
Figure 3:
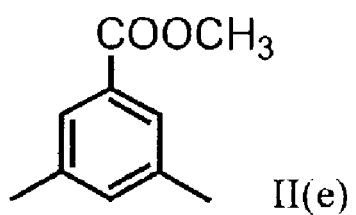
Figure 3:
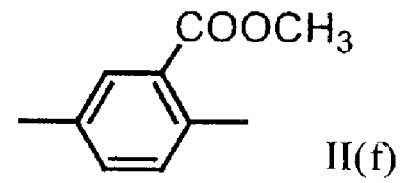
Figure 3:
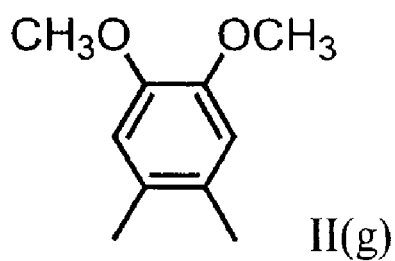
Figure 3:
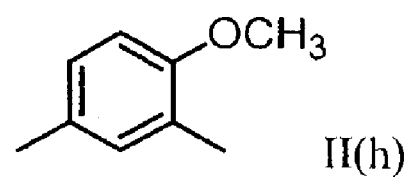
Figure 3:
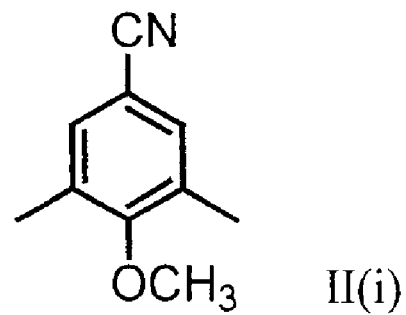
Figure 3:
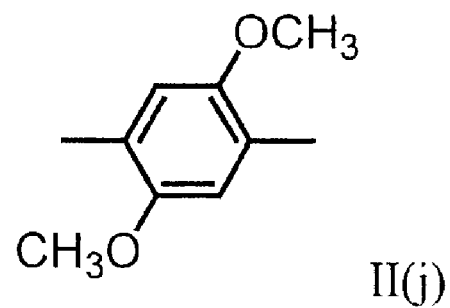
Figure 4:
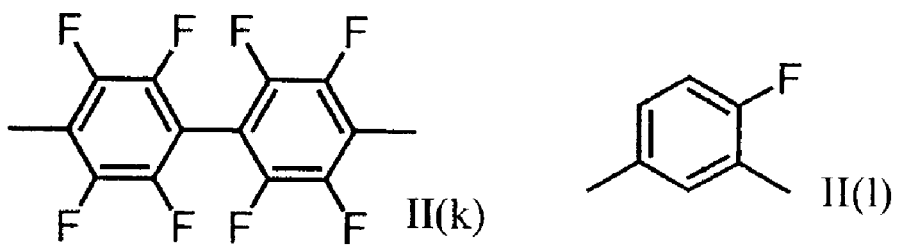
FIG. 4 shows Formulae II(k) through II(s) for a second monomeric unit useful in the invention.
Figure 4:
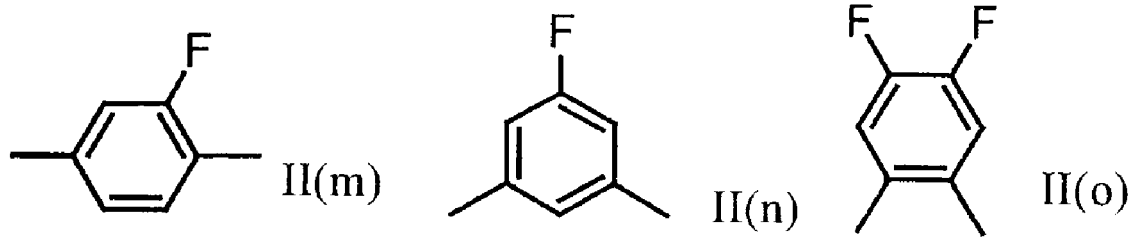
Figure 4:
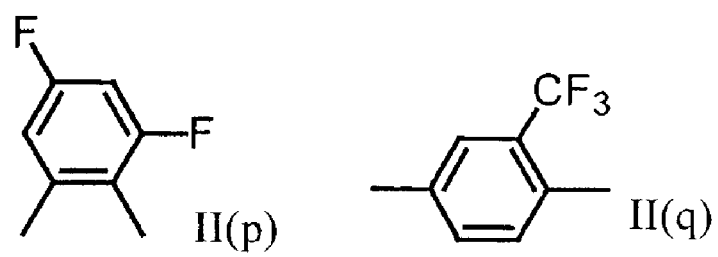
Figure 4:
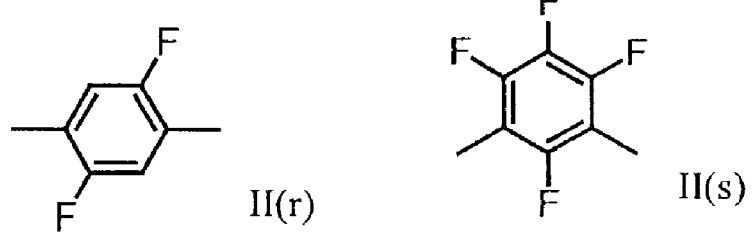
Figure 5:
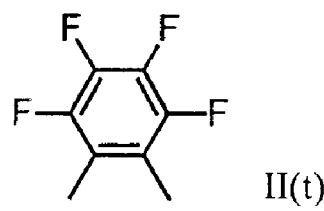
FIG. 5 shows Formulae II(t) through II(z) for a second monomeric unit useful in the invention.
Figure 5:
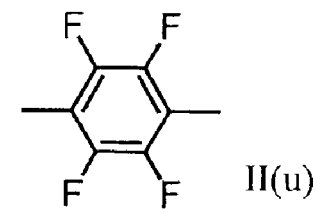
Figure 5:
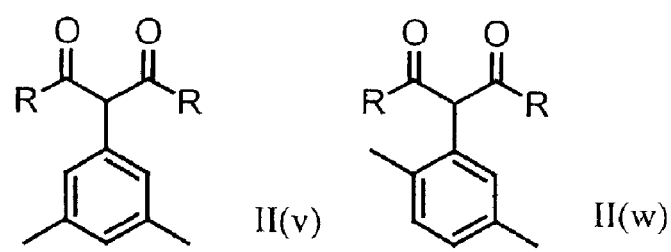
Figure 5:
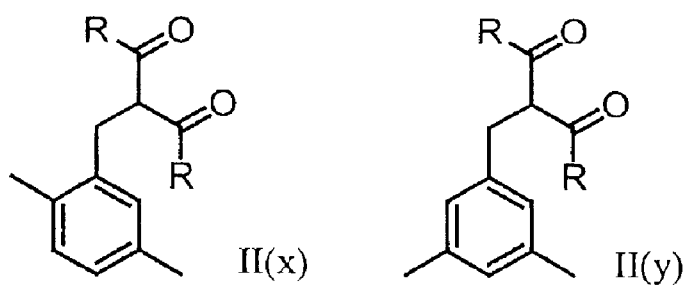
Figure 5:
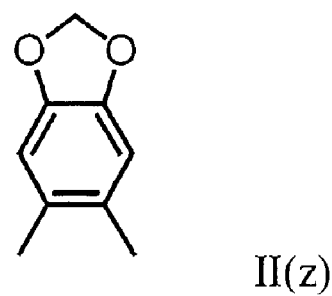

Examples of suitable second monomeric units with Formula II are shown in FIGS. 3 through 5 as Formulae II(a) through II(z), where:
  in Formulae II(v) through II(y):
  R is as described above for each of Formulae I, II, III, IV, V, VI, VII, VIII through XI.

Formula III:
Alternatively, the second monomeric unit can be a divalent 6-membered-ring heteroaromatic group having the structure shown in FIG. 6, Formula III. Preferred R groups are hydrogen, C$_1$ through C$_{12}$ alkyl groups (alternatively, C$_1$ through C$_5$ alkyl groups or C$_6$–C$_{12}$ alkyl groups), C$_6$–C$_{20}$ aryl groups, and C$_2$–C$_{20}$ heteroaryl groups. Examples of suitable E linking groups include pyridinediyl (—C$_5$H$_4$N—) and bipyridinediyl (—C$_5$H$_4$N—C$_5$H$_4$N—).

Figure 6:
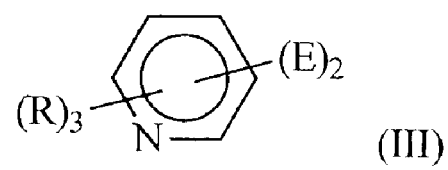
FIG. 6 shows Formula III and Formulae III(a) through III(g) for a second monomeric unit useful in the invention.
Figure 6:
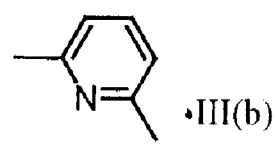
Figure 6:
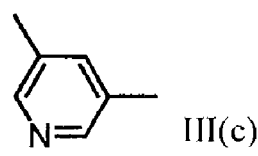
Figure 6:
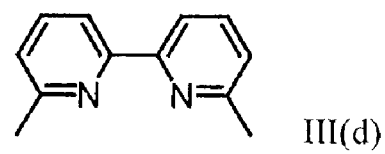
Figure 6:
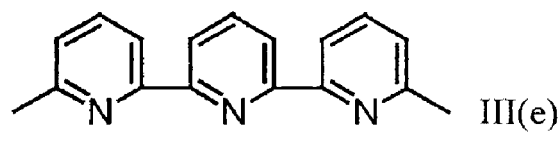
Figure 6:
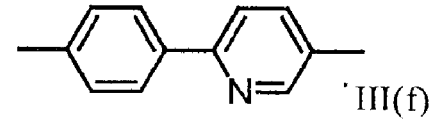
Figure 6:
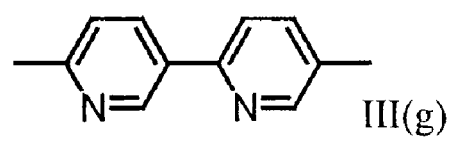

Examples of suitable second monomeric units having Formula III are shown in FIG. 6 as Fomulae III(a) through III(g).

Formula IV:
Alternatively, the second monomeric unit can be a 5-membered-ring heteroaromatic group having the structure shown in FIG. 7, Formula IV. Preferred R groups are hydrogen, C$_1$ through C$_{12}$ alkyl groups (alternatively, C$_1$ through C$_6$ alkyl groups or C$_6$ through C$_{12}$ alkyl groups), C$_6$–C$_{20}$ aryl groups (alternatively, C$_6$ though C$_{10}$ aryl groups), and C$_2$–C$_{20}$ heteroaryl groups (alternatively, C$_6$ though C$_{10}$ heteroaryl groups), more preferably C$_6$–C$_{12}$ aryl groups. Examples of suitable E linking groups include pyrrolediyl (—C$_4$H$_3$N—) and thiophenediyl (—C$_4$H$_3$S—).

Figure 7:
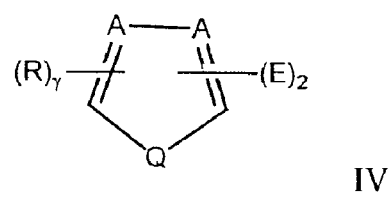
FIG. 7 shows Formula IV and Formulae IV(a) through IV(h) for a second monomeric unit useful in the invention.
Figure 7:
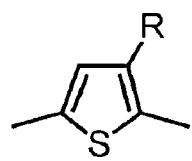
Figure 7:
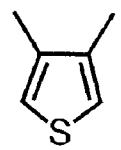
Figure 7:
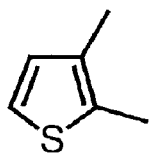
Figure 7:
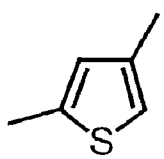
Figure 7:
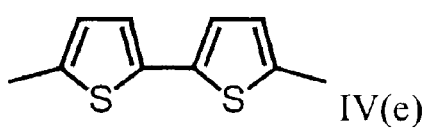
Figure 7:
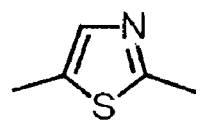
Figure 7:
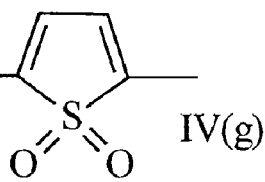
Figure 7:
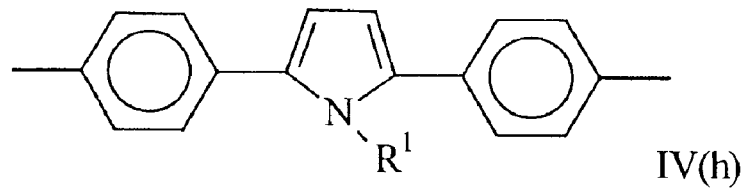

Examples of suitable second monomeric units with Formula IV are shown in FIG. 7 as Formulae IV(a) through IV(h), where:
  in Formula IV(a):
  R is as described above for each of Formulae I, II, III, IV, V, VI, VII, VIII through XI; and
  in Formula IV(h):
  R$^1$ is a substituent on a heteroatom which can be the same or different at each occurrence and is selected from alkyl, aryl, heteroalkyl and heteroaryl.

Figure 8:
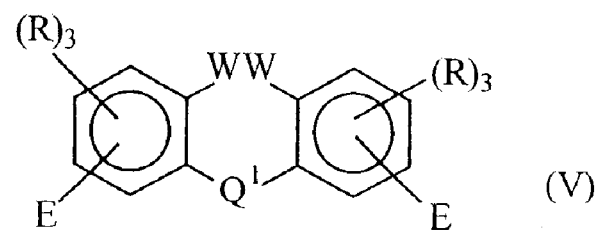
FIG. 8 shows Formula V and Formulae V(a) through V(e) for a second monomeric unit useful in the invention.
Figure 8:
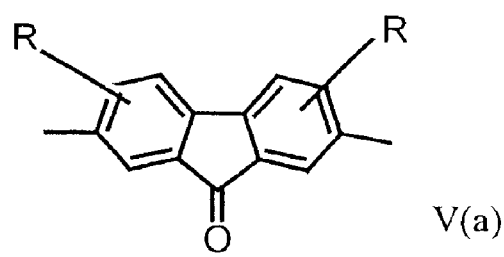
Figure 8:
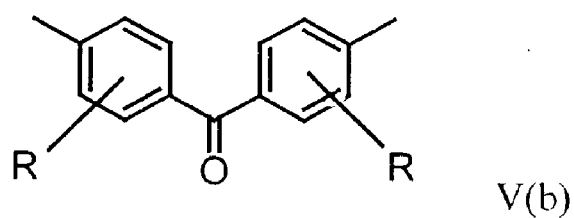
Figure 8:
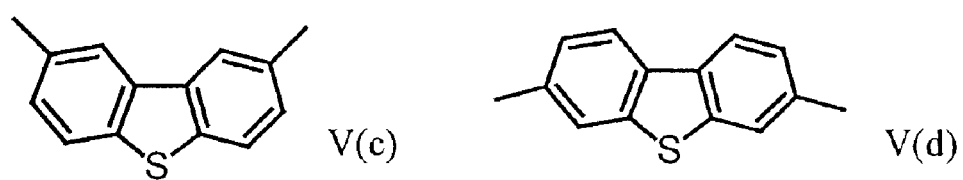
Figure 8:
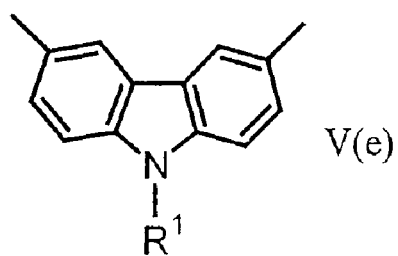

Formula V:
Alternatively the second monomeric unit can be an aromatic having the structure shown in FIG. 8, Formula V. The R groups are preferably hydrogen, C$_1$ through C$_{12}$ alkyl groups (alternatively, C$_1$ through C$_6$ alkyl groups or C$_6$ through C$_{12}$ alkyl groups), C$_6$–C$_{20}$ aryl groups (alternatively, C$_6$ through C$_{10}$ aryl groups), and C$_2$–C$_{20}$ heteroaryl groups (alternatively, C$_6$ through C$_{10}$ heteroaryl groups). Preferably the two W represent one single bond.

Examples of suitable second monomeric units of this type are those having the structure of Formulae V(a) through Formula V(e) where:
  in Formulae V(a), V(b):
  R is as described above for each of Formulae I, II, III, IV, V, VI, VII, VIII through XI; and
  In Formula V(e):
  R$^1$ is a substituent on a heteroatom which can be the same or different at each occurrence and is selected from alkyl, aryl, heteroalkyl and heteroaryl.

Formulae VI Through XI:
Alternatively the second monomeric unit can be a divalent fused ring aromatic group having the structure shown in FIG. 9, Formulae VI through VIII, and FIG. 10, Formulae IX through XI. The R groups are preferably hydrogen, C$_1$ through C$_{20}$ alkyl groups (alternatively, C$_1$ through C$_6$ alkyl groups or C$_6$ through C$_{12}$ alkyl groups), C$_6$–C$_{20}$ aryl groups, and C$_2$–C$_{20}$ heteroaryl groups.

Figure 9:
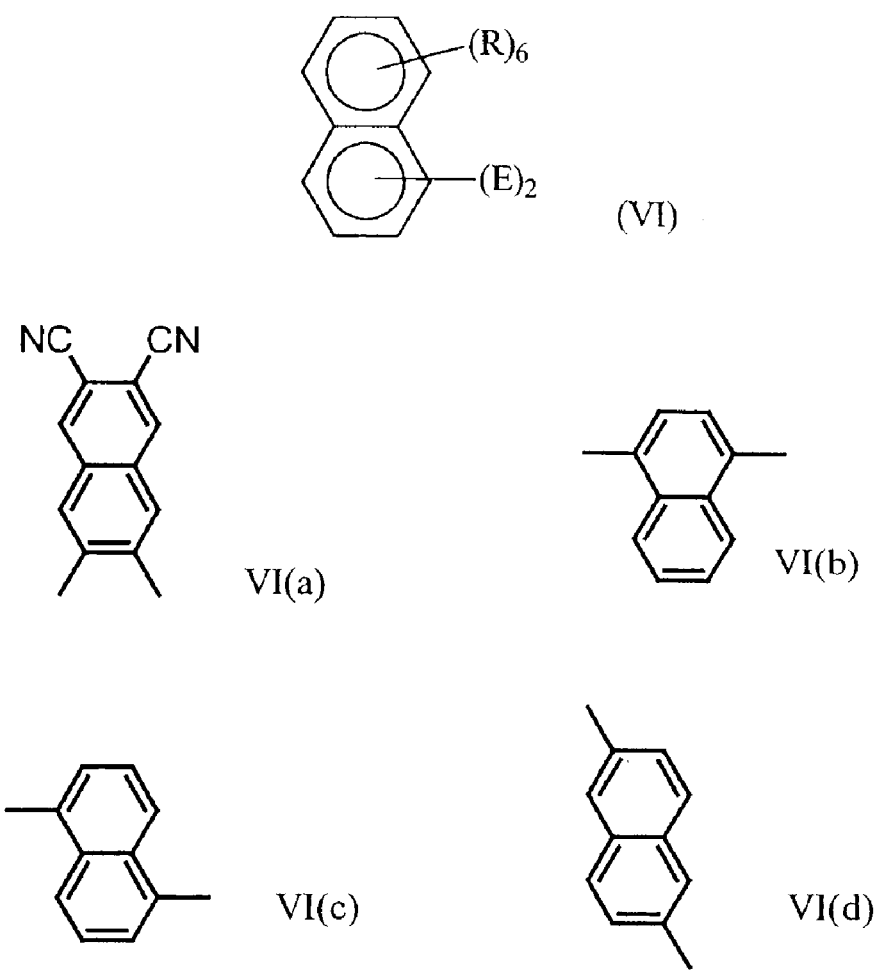
FIG. 9 shows Formulae VI and Formulae VI(a) through VI(d) for a second monomeric unit useful in the invention.

In Formula VI, the E's are preferably in the 1,4-, 1,5-, 1,8-, 2,3-, or 2,6-positions. Examples of suitable second monomeric units having Formula VI are shown in FIG. 9, Formulae VI(a) through VI(d).

Figure 10:
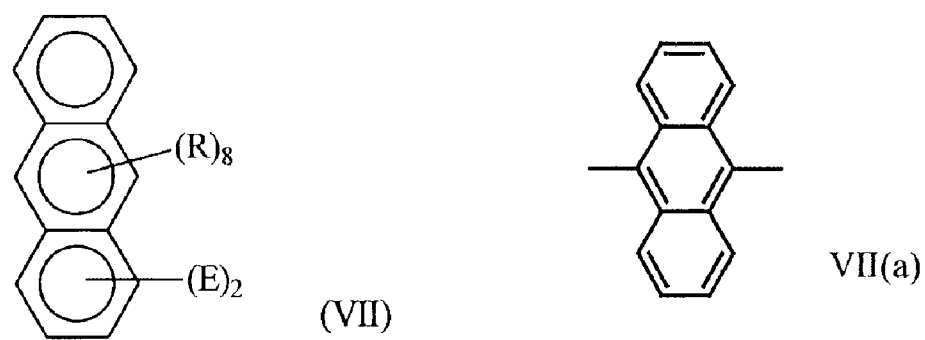
FIG. 10 shows Formula VII and Formula VII(a) for a second monomeric unit useful in the invention.
Figure 11:
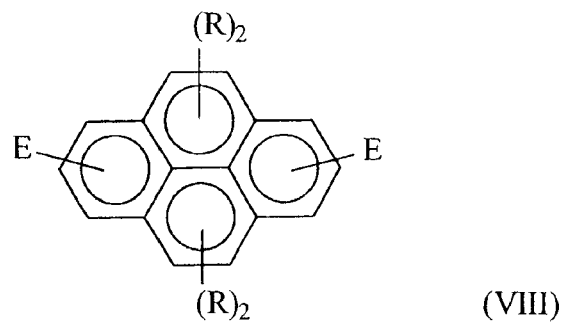
FIG. 11 shows Formulae VIII through XI for a second monomeric unit useful in the invention.
Figure 11:
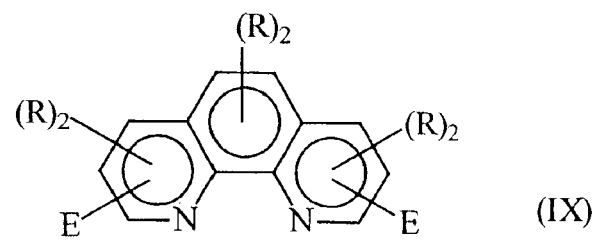
Figure 11:
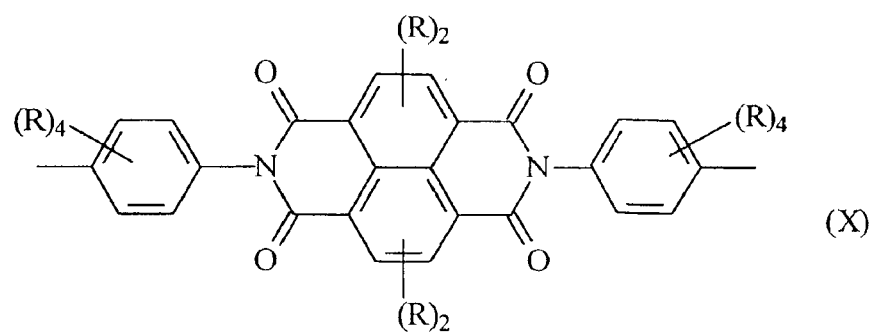
Figure 11:
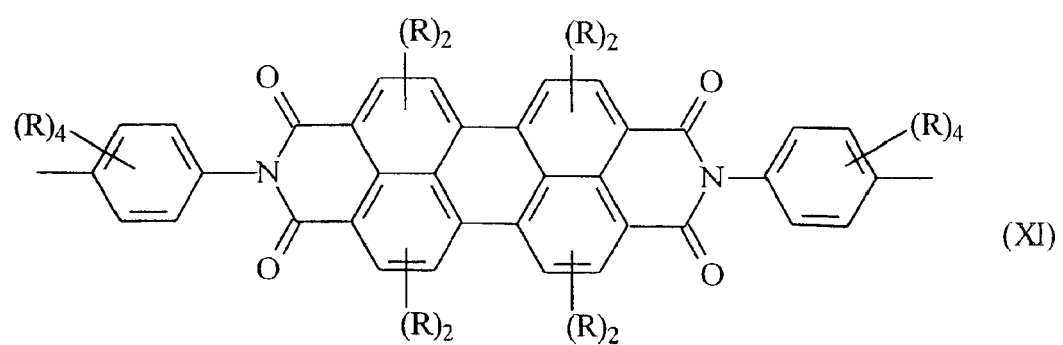

In Formula VII, the E's are preferably in the 1,4-, 1,5-, 1,8-, 2,3-, 2,6-, or 9,10-positions. An example of a suitable second monomeric unit having Formula VII is shown in FIG. 10, Formula VII(a).

In the copolymers of the invention, the R groups are essentially side chains off of the polymeric backbone. Thus, the final selection of the R groups should take into account the role these side chains may play in the properties of the final polymer. These properties include electronic properties, solubility properties, processibility properties, film-forming properties, to enhance or to reduce interchain interaction, to induce solubility in organic solvents, to induce compatibility in blends with host polymers, to induce high dielectric constant so as to solvate ions, to enhance ionic mobility, etc. In addition, where the R groups are substituted, steric effects of such substituents should be considered in substituent selection.

In the fluorene polymer of the invention, more than one of the second monomeric units can be present with the first monomeric unit. The relative molar proportion of first monomeric unit to the at least one second monomeric unit(s) can be from 99.9:0.1 to 1:99 or 99.5:0.5 to 10:90; alternatively 99:1 to 20:80, and further alternatively 99:1 to 50:50. The molecular weight can vary from several thousands up to several hundreds of thousands. The incorporation of the monomers in the formation of the polymer can be random or controlled, resulting in copolymers which include, but are not limited to, random copolymer, alternating copolymers and block copolymers.

The fluorene polymers of the invention contain at least one R substituent having the formula —C$_\psi$F$_{2\psi+1}$, where $\psi$ is an integer from 1–20, preferably 1–12.

The perfluoroalkyl group is a substitutuent on an aromatic ring. The proportion of monomeric units having perfluoroalkyl substitution is generally in the range of from 5 to 100 molar percent; preferably from 10 to 50 molar percent.

Process
The perfluoroalkylated fluorene polymers of the invention can be prepared by first forming perfluoroalkylated monomers, and then polymerizing to form the polymer. However, such an approach requires a separate synthesis for each monomer, which can be difficult. In another embodiment of the present invention, there is provided a more versatile process for the preparation of perfluoroalkylated fluorene polymers comprising first preparing the base fluorene polymers, and then treating the base polymers with a material capable of introducing the perfluoroalkyl group into the aromatic ring(s) of the polymer.

The polymerization to form the base fluorene polymer can generally be carried out by three known synthetic routes. In the first synthetic method, as described in Yamamoto, Progress in Polymer Science, Vol. 17, p 1153 (1992), the dihalo, preferably dibromo, derivatives of the monomeric units are reacted with a stoichiometric amount of a zerovalent nickel compound, such as bis(1,5-cyclooctadiene)nickel (0). In the second method, as described in Colon et al., Journal of Polymer Science, Part A, Polymer chemistry Edition, Vol. 28, p. 367 (1990), the dihalo derivatives of the monomeric units are reacted with catalytic amounts of Ni(II) compounds in the presence of stoichiometric amounts of a material capable of reducing the divalent nickel ion to zerovalent nickel. Suitable materials include zinc, magnesium, calcium and lithium. In the third synthetic method, as described in U.S. Pat. No. 5,962,631, and published PCT application WO 00/53565, a dihalo derivative of one monomeric unit is reacted with a derivative of another monomeric unit having two reactive groups selected from boronic acid, boronic acid esters, and boranes, in the presence of a zerovalent palladium catalyst, such as tetrakis (triphenylphosphine)Pd. This third reaction can take place in a two-phase medium requiring a phase transfer catalyst.

In some embodiments of the invention, the polymer can be reacted with an end-capping compound to convert the reactive end group to a non-reactive end group. The end-capping compound is generally added to a preformed polymer and ends the polymerization reaction. The end-capping compound is generally an aromatic compound having a single reactive group, such as an aromatic ring having a single halide group or boronic acid or ester group. Examples of suitable end-capping compounds include 9-bromoanthracene, 4-bromo-1,2-dimethoxybenzene, 1-bromopyrene, iodobenzene, bromobenzene, 2-bromo-9-fluorenone, benzeneboronic acid, and 4-methylbenzeneboronic acid. The end-capping group may also be designed to add functionality, such as charge transport properties and color shifting. It may also affect interchain aggregation.

After the base fluorene polymer is formed, it is reacted with a perfluoroalkylating reagent selected from (i) a perfluoroalkyl iodide and (ii) a perfluoroalkylsulfonyl chloride in the presence of a ruthenium (II) catalyst.

Suitable perfluoroalkyl iodides include those having from 1 to 20 carbon atoms, preferably 1 to 12, which may be linear, branched or cyclic. Many perfluoroalkyl iodides are commercially available. Others can be made by well-known synthetic techniques.

Suitable perfluoroalkylsulfonyl chlorides include those having from 1 to 20 carbon atoms, preferably 1 to 12, which may be linear, branched or cyclic. Many perfluoroalkylsulfonyl chlorides are commercially available. Others can be made by well-known synthetic techniques.

Suitable ruthenium(II) catalysts are neutral organometallic complexes with ligands such as phosphines, especially triphenylphosphine, carbon monoxide, cyclooctadiene, chloride, and hydride. A preferred catalyst is dichlorotris(triphenylphosphine)ruthenium(II). Many ruthenium(II) catalysts are commercially available. Others can be made by well-known synthetic techniques, as disclosed in, for example, N. Kamigata, T. Fukushima and M. Yoshida, *J. Chem. Soc. Perkin Trans.*, 1, 1989, 1559.

The perfluoroalkylation reaction is generally carried out in a solvent which does not react with the perfluoroalkylating reagent, and in which the base fluorene polymer is at least partially soluble. Examples of suitable solvents include electron deficient aromatics, such as chlorobenzenes. If higher reaction temperatures are required, then higher-boiling solvents are used. The reaction is generally carried out in an inert atmosphere, such as under nitrogen. The temperature generally is from about 100° C. to 250° C. The reaction time can vary from about one hour to three days. The reaction product can be isolated using known techniques, such as extraction or precipitation with a second solvent, and drying.

The resulting product will have perfluoroalkyl groups substituted on at least some of the aromatic rings in the polymer. The number of perfluoroalkyl substituents per polymer and their placement, i.e., which aromatic groups are substituted, depend on the chemical reactivity of the monomeric units which make up the polymer. Steric effects will be a factor.

Perfluoroalkylation of fluorene polymers and copolymers affects the electronic properties of the polymers. The perfluoroalkylated fluorene polymers are more electron deficient and have lower LUMO levels. This increases the electron conductivity of the polymers and facilitates electron injection/transport. Perfluoroalkylation will also affect other polymer properties, such as solubility, processability, and the morphology of polymer films.

Electronic Device

Figure 13:
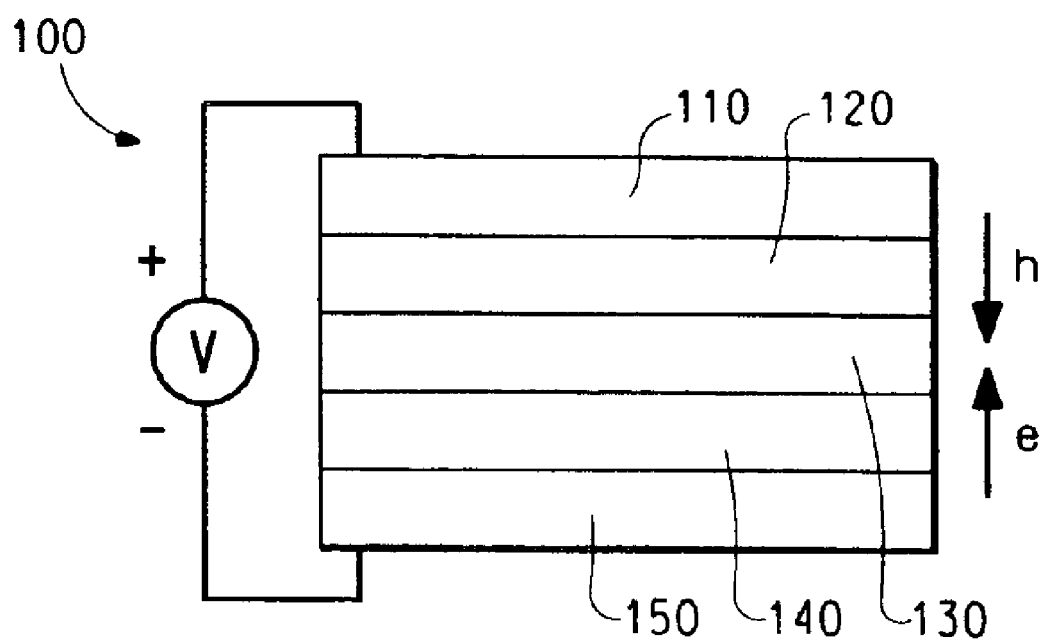
FIG. 13 is a schematic diagram of an electronic device that can incorporate the perfluoroalkylated fluorene polymer of the invention.

The present invention also relates to an electronic device comprising at least one photoactive layer positioned between two electrical contact layers, wherein at least one of the electroactive layers of the device includes the copolymer of the invention. As shown in FIG. 13, a typical device 100 has an anode layer 110 and a cathode layer 150 and electroactive layers 120, 130 and optionally 140 between the anode 110 and cathode 150. Adjacent to the anode is a hole injection/transport layer 120. Adjacent to the cathode is an optional layer 140 comprising an electron transport material. Between the hole injection/transport layer 120 and the cathode (or optional electron transport layer) is the photoactive layer 130. The copolymers of the invention can be useful in the hole injection/transport layer 120 and/or in the photoactive layer 130 and/or the optional electron injection/transport layer 140.

The device generally also includes a support (not shown) which can be adjacent to the anode or the cathode. Most frequently, the support is adjacent the anode. The support can be flexible or rigid, organic or inorganic. Generally, glass or flexible organic films are used as a support. The anode 110 is an electrode that is particularly efficient for injecting or collecting positive charge carriers. The anode is preferably made of materials containing a metal, mixed metal, alloy, metal oxide or mixed-metal oxide. Suitable metals include the Group 11 metals, the metals in Groups 4, 5, and 6, and the Group 8-10 transition metals. If the anode is to be light-transmitting, mixed-metal oxides of Groups 12, 13 and 14 metals, such as indium-tin-oxide, are generally used. The anode 110 may also comprise an organic material such as polyaniline as described in "Flexible light-emitting diodes made from soluble conducting polymer," *Nature* vol. 357, pp 477–479 (Jun. 11, 1992).

The anode layer is 110 usually applied by a physical vapor deposition process or spin-cast process. The term "physical vapor deposition" refers to various deposition approaches carried out in vacuo. Thus, for example, physical vapor deposition includes all forms of sputtering, including ion beam sputtering, as well as all forms of vapor deposition such as e-beam evaporation and resistance evaporation. A specific form of physical vapor deposition which is useful is rf magnetron sputtering.

The copolymers of the invention may function as hole injection/transport materials in layer 120. Other materials which may facilitate hole injection/transport include N,N'-diphenyl-N,N'-bis(3-methylphenyl)-[1,1'-biphenyl]-4,4'-diamine (TPD) and bis[4-(N,N-diethylamino)-2-methylphenyl](4-methylphenyl)methane (MPMP), and hole injection/transport polymers such as polyvinylcarbazole (PVK), (phenylmethyl)polysilane, poly(3,4-ethylenedioxythiophene) (PEDOT), and polyaniline (PANI); electron and hole injection/transporting materials such as 4,4'-N,N'-dicarbazole biphenyl (BCP); or light-emitting materials with good electron and hole injection/transport properties, such as chelated oxinoid compounds, such as tris(8-hydroxyquinolato)aluminum ($Alq_3$).

The hole injection/transport layer 120 can be applied using any conventional means, including spin-coating, casting, and printing, such as gravure printing. The layer can also be applied by ink jet printing, thermal patterning, or physical vapor deposition.

In general, the inorganic anode and the hole injection/transport layer 120 will be patterned. It is understood that the pattern may vary as desired. The layers can be applied in a pattern by, for example, positioning a patterned mask or photoresist on the first flexible composite barrier structure prior to applying the first electrical contact layer material. Alternatively, the layers can be applied as an overall layer and subsequently patterned using, for example, a photoresist and wet chemical etching. The hole injection/transport layer can also be applied in a pattern by ink jet printing, lithography or thermal transfer patterning. Other processes for patterning that are well known in the art can also be used.

Depending upon the application of the device 100, the photoactive layer 130 can be a light-emitting layer that is activated by an applied voltage (such as in a light-emitting diode or light-emitting electrochemical cell), a layer of material that responds to radiant energy and generates a signal with or without an applied bias voltage (such as in a photodetector). Examples of photodetectors include photoconductive cells, photoresistors, photoswitches, phototransistors, and phototubes, and photovoltaic cells, as these terms are describe in Markus, John, *Electronics and Nucleonics Dictionary*, 470 and 476 (McGraw-Hill, Inc. 1966).

Where the device 100 is a light-emitting device, the photoactive layer 130 will emit light when sufficient bias voltage is applied to the electrical contact layers. The copolymers of the invention may be used in the light-emitting active layer 130. Other known light-emitting materials include small molecule materials such as those described in, for example, Tang, U.S. Pat. No. 4,356,429, Van Slyke et al., U.S. Pat. No. 4,539,507, the relevant portions of which are incorporated herein by reference. Alternatively, such materials can be polymeric materials such as those described in Friend et al. (U.S. Pat. No. 5,247,190), Heeger et al. (U.S. Pat. No. 5,408,109), Nakano et al. (U.S. Pat. No. 5,317,169), the relevant portions of which are incorporated herein by reference. The light-emitting materials may be dispersed in a matrix of another material, with and without additives, but preferably form a layer alone. The active organic layer generally has a thickness in the range of 50–500 nm.

Where the electronic device 100 is a photodetector, the photoactive layer 130 responds to radiant energy and produces a signal either with or without a biased voltage. Materials that respond to radiant energy and is capable of generating a signal with a biased voltage (such as in the case of a photoconductive cells, photoresistors, photoswitches, phototransistors, phototubes) include, for example, many conjugated polymers and electroluminescent materials. Materials that respond to radiant energy and are capable of generating a signal without a biased voltage (such as in the case of a photoconductive cell or a photovoltaic cell) include materials that chemically react to light and thereby generate a signal. Such light-sensitive chemically reactive materials include for example, many conjugated polymers and electro- and photo-luminescent materials. Specific examples include, but are not limited to, MEH-PPV ("Optocoupler made from semiconducting polymers", G. Yu, K. Pakbaz, and A. J. Heeger, *Journal of Electronic Materials*, Vol. 23, pp 925–928 (1994); and MEH-PPV Composites with CN-PPV ("Efficient Photodiodes from Interpenetrating Polymer Networks", J. J. M. Halls et al. (Cambridge group) *Nature* Vol. 376, pp. 498–500, 1995).

The active layer 130 containing the active organic material can be applied from solutions by any conventional means, including spin-coating, casting, and printing. The active organic materials can be applied directly by vapor deposition processes, depending upon the nature of the materials. It is also possible to apply an active polymer precursor and then convert to the polymer, typically by heating.

The cathode 150 is an electrode that is particularly efficient for injecting or collecting electrons or negative charge carriers. The cathode can be any metal or nonmetal having a lower work function than the first electrical contact layer (in this case, an anode). Materials for the second electrical contact layer can be selected from alkalil metals of Group 1 (e.g., Li, Cs), the Group 2 (alkaline earth) metals, the Group 12 metals, the rare earths, the lanthanides, and the actinides. Materials such as aluminum, indium, calcium, barium, and magnesium, as well as combinations, can be used.

The cathode layer 150 is usually applied by a physical vapor deposition process. In general, the cathode layer will be patterned, as discussed above in reference to the anode layer 110 and conductive polymer layer 120. Similar processing techniques can be used to pattern the cathode layer.

Optional layer 140 can function both to facilitate electron transport, and also serve as a buffer layer or confinement layer to prevent quenching reactions at layer interfaces. Preferably, this layer promotes electron mobility and reduces quenching reactions. Examples of electron transport materials for optional layer 140 include metal chelated oxinoid compounds, such as tris(8-hydroxyquinolato) aluminum ($Alq_3$); phenanthroline-based compounds, such as 2,9-dimethyl-4,7-diphenyl-1,10-phenanthroline (DDPA) or 4,7-diphenyl-1,10-phenanthroline (DPA), and azole compounds such as 2-(4-biphenylyl)-5-(4-t-butylphenyl)-1,3,4-oxadiazole (PBD) and 3-(4-biphenylyl)-4-phenyl-5-(4-t-butylphenyl)-1,2,4-triazole (TAZ).

It is known to have other layers in organic electronic devices. For example, there can be a layer (not shown) between the conductive polymer layer 120 and the active layer 130 to facilitate positive charge transport and/or band-gap matching of the layers, or to function as a protective layer. Similarly, there can be additional layers (not shown) between the active layer 130 and the cathode layer 150 to facilitate negative charge transport and/or band-gap matching between the layers, or to function as a protective layer. Layers that are known in the art can be used. In addition, any of the above-described layers can be made of two or more layers. Alternatively, some or all of inorganic anode layer 110, the conductive polymer layer 120, the active layer 130, and cathode layer 150, may be surface treated to increase charge carrier transport efficiency. The choice of materials for each of the component layers is preferably determined by balancing the goals of providing a device with high device efficiency.

The device 100 can be prepared by sequentially depositing the individual layers on a suitable substrate. Substrates such as glass and polymeric films can be used. In most cases the anode is applied to the substrate and the layers are built up from there. However, it is possible to first apply the cathode to a substrate and add the layers in the reverse order. In general, the different layers will have the following range of thicknesses: inorganic anode 110, 500–5000 Å, preferably 1000–2000 Å; conductive polymer layer 120, 50–2500 Å, preferably 200–2000 Å; light-emitting layer 130, 10–1000 Å, preferably 100–800 Å; optional electron transport layer 140, 50–1000 Å, preferably 200–800 Å; cathode 150, 200–10000 Å, preferably 300–5000 Å.

EXAMPLES

The following examples illustrate certain features and advantages of the present invention. They are intended to be illustrative of the invention, but not limiting. All percentages are by weight, unless otherwise indicated.

Example 1

This example illustrates the preparation of a base fluorene polymer, 2,7-poly(9,9-bis(2-ethylhexyl)fluorene).

Under inert conditions, DMF (5 ml) was added to a 50 ml Schlenck tube equipped with a stirring bar and containing bis(1,5-cyclooctadiene)nickel(0) (2.231 g, 8.11 mmol), 2,2'-bipyridyl (1.267 g, 8.11 mmol), and 1,5-cyclooctadiene (0.877 g, 8.11 mmol). The ensuing deep blue/purple solution was stirred at 60° C. for 30 minutes, and then a solution of 2,7-dibromo-9,9-bis(2-ethylhexyl)fluorene (2.00 g, 3.65 mmol) in toluene (20 ml) was added via syringe. The reaction mixture was then stirred at 75° C. for 5 days. The mixture was cooled to room temperature and precipitated into a solution of methanol (100 ml), acetone (100 ml) and concentrated hydrochloric acid (5 ml). After stirring for 2 hours, the mixture was filtered. The solid residue was then dissolved in chloroform, and again precipitated into a solution of methanol (100 ml), acetone (100 ml) and concentrated hydrochloric acid (5 ml). After stirring for 1 hour, the mixture was filtered. Finally the residue was successively washed with methanol, water and methanol and dried in vacuo. The copolymer was characterized by nuclear magnetic resonance (NMR) and the number average molecular weight ($M_n$) was determined by gel permeation chromatography (GPC).

Example 1A

The procedure of Example 1 was repeated, except that the reaction mixture was stirred at 75° C. for 24 hours, instead of for 5 days. In addition, after the mixture was filtered, the resulting solid was again dissolved in chloroform and precipitated in pure methanol, before the residue was successively washed with methanol, water and methanol and dried in vacuo. Essentially the same molecular weight provided in Table 1 below were obtained.

Examples 2–4

Examples 2–4 illustrate the preparation of perfluoroalkylated fluorene copolymers of the invention.

Example 2

In this example, perfluorodecyl substituents were added to the base fluorene polymer from Example 1.

Under a nitrogen atmosphere, a 100 ml round bottom flask fitted with a water condenser was charged with 2,7-poly(9,9-bis(2-ethylhexyl)fluorene) (0.50 g, 1.29 mmol) from Example 1, 1-iodoperfluorodecane (1.83 g, 2.84 mmol), and 1,2,4-trichlorobenzene (50 ml). The vessel was then heated to 190° C. for 24 h. After cooling to room temperature, the reaction solution was extracted with chloroform. The chloroform layer was successively washed with dilute aqueous sodium bisulfite, dilute aqueous sodium bicarbonate, dilute aqueous sodium hydroxide, and water. The organic layer was dried over magnesium sulfate, then evaporated to dryness. The resulting polymer was analyzed by $F^{19}$ nmr, which indicated the addition of approximately 10–15 molar percent perfluorodecyl groups.

Example 3

In this example, perfluoromethyl substituents were added to the base fluorene polymer from Example 1.

Under a nitrogen atmosphere, a glass pressure vessel was charged with 2,7-poly(9,9-bis(2-ethylhexyl)fluorene) (0.50 g, 1.29 mmol) from Example 1, trifluoromethanesulfonyl chloride (0.48 g, 2.84 mmol), dichlorotris(triphenylphosphine)ruthenium(II) (12 mg, 0.0125 mmol) and 1,2,4-trichlorobenzene (20 ml). The vessel was cooled to −30° C. in dry ice/acetone bath and evacuated, then flushed with nitrogen. This cycle was repeated 2 more times. The vessel was then warmed to room temperature and placed in the autoclave where it was heated to 130° C. for 24 h. The vessel was then cooled to room temperature and purged with nitrogen. The trichlorobenzene solution was precipitated into acetone. Solid residue was collected, washed with acetone and dried in vacuo. The resulting polymer was analyzed by $F^{19}$ NMR, which indicated the addition of approximately 10–15 molar percent trifluoromethyl groups.

Example 4

In this example, perfluorobutyl substituents were added to the base fluorene polymer from Example 1.

Under a nitrogen atmosphere, a 100 ml round bottom flask fitted with a water condenser was charged with 2,7-poly(9,9-bis(2-ethylhexyl)fluorene) (0.50 g, 1.29 mmol) from Example 1, perfluorobutylsulfonyl chloride (0.905 g, 2.84 mmol), dichlorotris(triphenylphosphine)ruthenium(II) (12 mg, 0.0125 mmol) and 1,2,4-trichlorobenzene (20 ml). The vessel was then heated to 120° C. for 24 h. After cooling the vessel to room temperature, the reaction solution was precipitated into acetone. The solid residue was collected, washed with acetone and dried in vacuo. The resulting polymer was analyzed by $F^{19}$ nmr, which indicated the addition of approximately 10–15 molar percent perfluorobutyl groups.

While this invention has been described with respect to what is at present considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent formulations and functions.

What is claimed is:

1. A polymer comprising one or more monomeric units having a Formula I,

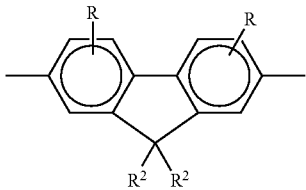

(I)

where:

R is a substituent on a carbon atom in an aromatic ring, which can be the same or different at each occurrence and is selected from hydrogen, alkyl, aryl, heteroalkyl, heteroaryl, F, —CN, —OR$^1$, —CO$_2$R$^1$, —C$_\psi$H$_\theta$F$_\lambda$, —OC$_\psi$H$_\theta$F$_\lambda$, —SR$^1$, —N(R$^1$)$_2$, —P(R$^1$)$_2$, —SOR$^1$, —SO$_2$R$^1$, —NO$_2$, and beta-dicarbonyls having Formula XII;

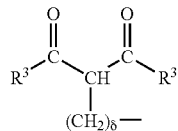

(XII)

or adjacent R groups together can form a ring selected from 5-membered cycloalkyl, 6-membered cycloalkyl, 5-membered aryl, 6-membered aryl, 5-membered heteroaryl and 6-membered heteroaryl, such that:

R$^1$ is a substituent on a heteroatom which can be the same or different at each occurrence and is selected from alkyl, aryl, heteroalkyl and heteroaryl; and $\psi$ is an integer between 1 and 20, and $\theta$ and $\lambda$ are integers satisfying Equation A1 below:

$$\theta+\lambda=2\psi+1;$$ (Equation A1);

R$^2$ is a substituent on a carbon atom not in an aromatic ring, which can be the same or different at each occurrence and is selected from hydrogen, alkyl, aryl, heteroalkyl, heteroaryl and —C$_\psi$H$_\theta$F$_\lambda$, with the proviso that the Formula I monomeric unit contains at least one R substituent with the formula —C$_\psi$F$_{2\psi+1}$.

2. The polymer of claim 1, further comprising end-capping groups comprising an aromatic group.

3. An electronic device comprising at least one electroactive layer comprising the polymer of claim 1.

4. The device of claim 3, wherein the device comprises a hole injection/transport layer comprising the polymer.

5. The device of claim 3, wherein the device comprises an electron injection/transport layer comprising the polymer.

6. The device of claim 3, wherein one or more of the electroactive layer comprises a light-emitting material comprising the polymer of claim 1.

7. The device of claim 3, wherein the device is selected from a light-emitting device, a photodetector, and a photovoltaic device.

8. The device of claim 3, wherein the device is an electroluminescent display.

* * * * *